United States Patent [19]

Papenhagen et al.

[11] 4,369,670
[45] Jan. 25, 1983

[54] MULTI-LINK DRIVE PEDAL OF PLASTIC MATERIAL

[75] Inventors: Dieter Papenhagen, Backnang-Heiningen; Norbert Komoschinski, Winnenden, both of Fed. Rep. of Germany

[73] Assignee: Daimler-Benz Aktiengesellschaft, Stuttgart, Fed. Rep. of Germany

[21] Appl. No.: 177,059

[22] Filed: Aug. 11, 1980

[30] Foreign Application Priority Data

Aug. 11, 1979 [DE] Fed. Rep. of Germany ....... 2932671

[51] Int. Cl.³ .......................... G05G 1/14; F16B 7/20
[52] U.S. Cl. ...................................... 74/513; 74/560; 403/348
[58] Field of Search .................. 74/513, 560; 403/348; 24/201 A, 221 R

[56] References Cited

U.S. PATENT DOCUMENTS

| | | | |
|---|---|---|---|
| 988,896 | 4/1911 | Quinn | 24/221 R |
| 3,966,340 | 6/1976 | Morris | 24/221 R |
| 4,218,937 | 8/1980 | Albrecht et al. | 74/513 |

*Primary Examiner*—Kenneth Dorner
*Attorney, Agent, or Firm*—Paul M. Craig, Jr.

[57] ABSTRACT

A multiple-link gas pedal of a synthetic resionous material for a motor vehicle. The links of the gas pedal are joined by hinge-like film hinges integral in the material. A connecting member for a hinged connection of the foot plate with a pivotal lever suspended into a foot space is arranged in a zone of an upper end of the foot plate on a rear side thereof. A mounting member is articulated to the connecting member through a further film hinge. The mounting member is provided with a bore for receiving the free end of the lever. The bore exhibits at least one flaring portion and a lower end of the lever exhibits projections corresponding in number and shape to the flaring portions. After a passing of the lever end through the bore, the constructional position is obtained by mutual twisting of the components, in such a way that the projections rest on the underside of the mounting member on marginal zones of the bore which are not widened. The lever is provided with shoulders above the projections, which shoulders, after an assembly of the parts of the gas pedal, rest on a top side of the mounting member.

7 Claims, 4 Drawing Figures

U.S. Patent   Jan. 25, 1983   4,369,670
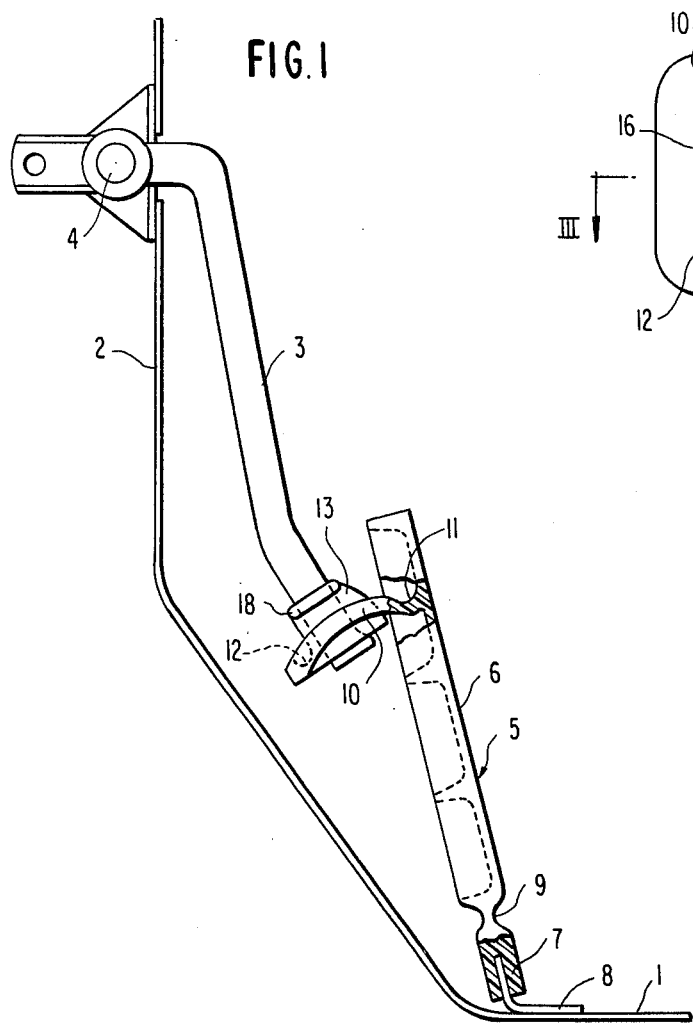
FIG.1
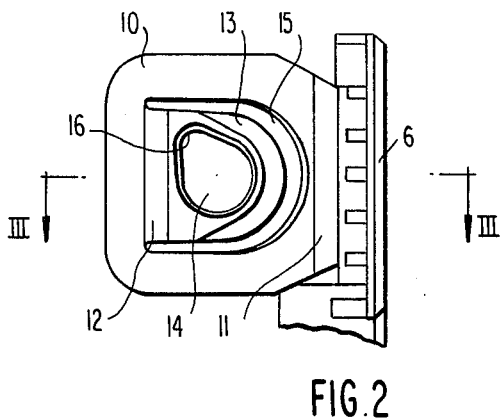
FIG.2
FIG.3
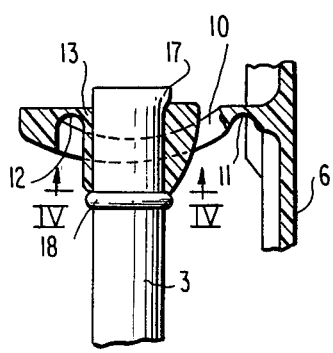
FIG.4
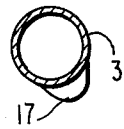

MULTI-LINK DRIVE PEDAL OF PLASTIC MATERIAL

The present invention relates to a drive pedal and, more particularly, to a multiple-link gas pedal or accelerator for a motor vehicle, which is fashioned of a synthetic resinous material.

Multiple-link gas pedals have been proposed when the links are joined by hinge-like film hinges integrally formed with the material, with a connecting member for the hinged connection of the foot plate with a pivotal lever suspended in the foot space of the vehicle being arranged in a zone of an upper end of the foot plate of the pedal on a rear side thereof, and wherein a mounting member is articulated to the connecting member through a further film hinge, which mounting member is provided with a bore for receiving the free end of the lever which at least in this zone has a rounded cross section.

A gas pedal of the aforementioned type has been proposed in, for example, Offenlungsschrift 2,728,787. In the construction proposed therein, a free end of the lever is fixed to a member of the accelerator by way of a clamping connection to be attached with a screw or other fastener. Various parts such as screws, nuts, and washers must be made available in order to enable such a connection. However, the requirement for these additional various parts has an adverse effect in mass production techniques and is furthermore disadvantageous because of the additional working step required for tightening up the fastening connection.

The aim underlying the present invention essentially resides in providing a multiple-link accelerator or gas pedal of a synthetic resinous material which enables a mounting of the accelerator without any additional components and requires only a simple working step for assembly.

In accordance with advantageous features of the present invention, a bore is provided with at least one flaring portion and a lower end of the lever is provided with projections corresponding in number and shape to the flaring portions. After the lever end has passed through the bore, the constructional position may be attained by twisting the parts with respect to each other in such a manner that the projections rest on an underside of the mounting member on marginal zones of the bore which have not been widened. The lever is provided with shoulders above the projections which shoulders, after assembly of the parts, rest on a top side of the mounting member.

Advantageously, in accordance with the present invention, the shoulders are fashioned as an annular bead or a torus.

Accordingly, it is an object of the present invention to provide a multiple-link gas pedal or accelerator of a synthetic resinous material which avoids, by simple means, shortcomings and disadvantages encountered in the prior art.

Another object of the present invention resides in providing a multiple-link gas pedal or accelerator of a synthetic resinous material which is simple in construction and therefore relatively inexpensive to manufacture.

Yet another object of the present invention resides in providing a multiple-link gas pedal or accelerator of a synthetic resinous material which may readily be installed without the need of providing additional fastening components.

A still further object of the present invention resides in providing a multiple-link gas pedal or accelerator of a synthetic resinous material which may readily be installed or assembled in a single simple working step.

These and other objects, features, and advantages of the present invention will become more apparent from the following description when taken in connection with the accompanying drawing which shows, for the purposes of illustration only, one embodiment in accordance with the present invention, and wherein:

FIG. 1 is a lateral partial cross sectional view of a gas pedal or accelerator constructed in accordance with the present invention arranged in a foot space of a motor vehicle;

FIG. 2 is an enlarged top view of a connection member and mounting member of the gas pedal or accelerator construction in accordance with the present invention;

FIG. 3 is a cross sectional view taken along the line III—III in FIG. 2 with an actuating lever inserted therein; and FIG. 4 is a cross sectional view along line IV—IV in FIG. 3 with the connecting member and mounting member removed.

Referring now to the drawings wherein like reference numerals are used in both views to designate like parts, and, more particularly, to FIG. 1, according to this Figure, a foot space of a vehicle is defined in part by a floor 1, and a front wall 2 with such foot space accommodating, inter alia, a gas pedal generally designated by the reference numeral 5 and an actuating lever 3 pivotable about a fulcrum 4 and hanging in the foot space. The actuating lever 3 is articulated to the accelerator or gas pedal 5.

The gas pedal 5 consists essentially of a synthetic resinous material and is formed of multiple-links, with the individual links of the gas pedal 5 being in hinged connection with one another by way of film hinges integrally molded with the synthetic resinous material. The gas pedal 5 includes a foot plate 6 and a fastening element 7 attached to a lower end of the foot plate 6 through a film hinge 9. The fastening element 7 may be placed on an attachment bracket 8 welded to the floor 1 and secured in place by means of a screw or some other fastening means. A connecting member 10 is articulated to a rear side of the foot plate 6 through a second film hinge 11 in a zone of an upper end of the foot plate 6.

A mounting member 13 forms the third member of the gas pedal 5 and is articulated to the connecting member 10 through a third film hinge 12. A bore 14 is provided in the mounting member 13, with the bore being adapted to accommodate a free end of the actuating lever 3. The actuating lever 3 is introduced into the bore 14 and extends approximately linearly. The mounting member 13 proper moves in a recess 15 of the connecting member 10 which, as shown most clearly in FIG. 3, has an arcuate configuration.

As shown in FIGS. 2 and 3, the bore 14 includes a unilateral flaring portion 16 and associated therewith on a lower free end of the actuating lever 3 is a correspondingly formed projection 17 so that the lever 3 has an approximate configuration of a cam.

During assembly of the gas pedal to the lever 3, the projection 17 of the lever 3 is pushed through the flaring portion 16 of the bore 14 and subsequently the lever 3 is twisted with respect to the mounting member 13 by about 180° into its constructional position so that an escape through the bore 14 in an upper direction is no longer possible. In this position, an annular bead 18 of the actuating lever 3 rests on a top side of the mounting member 13 so that an axial fastening is attaind in both directions.

While we have shown and described only one embodiment in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A multiple-link gas pedal for motor vehicles including a foot plate, a connecting means for enabling a connection of the gas pedal to a pivotable actuating lever, hinge means for articulatingly connecting the connecting means on a rear side of the foot plate in an area of an upper end thereof, mounting means for mounting the actuating lever to the connecting means, and a further hinge means for articulatingly connecting the mounting means to the connecting means, the mounting means includes a bore adapted to receive a free end of the actuating lever, characterized in that the bore is provided with at least one flaring portion, and in that a lower end of the actuating lever is provided with at least one projection having a shape corresponding to the flaring portion of the bore whereby, after an introduction of an end of the actuating lever into the bore and a mutual twisting between the actuating lever and the mounting means, the at least one projection rests on an underside of the mounting means along marginal zones of the bore which are not widened.

2. A multiple-link gas pedal according to claim 1, characterized in that means are provided on the lever at a position spaced from the at least one projection for axially fixing the mounting means relative to the actuating lever after an insertion of the lever into the bore of the mounting means.

3. A multiple-link gas pedal according to claim 2, characterized in that said means for axially fixing includes at least one shoulder disposed above the projection and adapted to rest on a top side of the mounting means after assembly of the actuating lever to the mounting means.

4. A multiple-link gas pedal according to claim 3, characterized in that the gas pedal is made of a synthetic resinous material.

5. A multiple-link gas pedal according to claim 4, characterized in that a free end of the lever has a round cross sectional configuration.

6. A multiple-link gas pedal according to claim 5, characterized in that the at least one shoulder is fashioned as an annular bead on the actuating lever.

7. A multiple-link gas pedal according to claim 1, characterized in that the first and second hinge means are film hinges integrally formed from the material of the gas pedal.

* * * * *